Aug. 18, 1959 A. P. STERN 2,900,439

COLOR TELEVISION SIGNAL CONVERSION SYSTEM

Filed Dec. 29, 1953 5 Sheets-Sheet 1

Inventor:
Arthur P. Stern,
by Charles M. Hutchins
His Attorney.

Inventor:
Arthur P. Stern,
by Charles M. Hutchins
His Attorney.

COLOR TELEVISION SIGNAL CONVERSION SYSTEM

Filed Dec. 29, 1953 5 Sheets-Sheet 3

Inventor:
Arthur P. Stern,
by Charles M. Hutchins
His Attorney.

Inventor:
Arthur P. Stern,
by Charles M. Hutchins
His Attorney.

COLOR TELEVISION SIGNAL CONVERSION SYSTEM

Filed Dec. 29, 1953 5 Sheets-Sheet 5

Inventor
Arthur P. Stern,
by Charles M. Hutchins
His Attorney.

United States Patent Office 2,900,439

Patented Aug. 18, 1959

2,900,439

COLOR TELEVISION SIGNAL CONVERSION SYSTEM

Arthur P. Stern, Syracuse, N.Y., assignor to General Electric Company, a corporation of New York Application December 29, 1953, Serial No. 400,857

11 Claims. (Cl. 178—5.4)

This invention relates to electrical apparatus and, more specifically, to electric circuits for incorporation in color television receivers in which the picture tube is of the single-electron-gun type.

The type of color television signal which up to the present time has found the most favor in the industry is a signal composed of three components. The first of these components, which occupies the lower part of the frequency band assigned to color television transmission, is the luminance component, which is expressive only of the brightness, but not the color, of the element of scene being scanned at the time. The other two components are the so-called chrominance components, which are respectively impressed on two subcarrier waves of equal frequency but of ninety-degree phase displacement with respect to each other. These chrominance components carry the color information and occupy the upper part of the frequency band assigned to color television transmission. They may be transmitted in a suppressed-subcarrier fashion. In order to make economical use of the available frequency spectrum, provision has been made for the luminance and chrominance components to overlap each other slightly in the spectrum, a fact which renders detection of the signals slightly more difficult than it would otherwise be. However, since the detection problem can be solved, it is generally felt that the resulting economy in use of the available spectrum justifies the inconvenience caused by frequency overlap. This is particularly true since a certain bandwidth of the available transmitting frequency spectrum must be granted to each transmitting station, and it is highly desirable that the width of such channel for color transmission be the same as the width of the earlier assigned channels for monochrome transmission in order to permit compatibility of the color television signal with existing monochrome receivers.

It is seen that the color television signal presently favored in the industry has been designed mainly with its transmission properties, rather than ease of detection and reproduction of picture, in mind. A further example of this general statement is the fact that, while the commonly-accepted color television signal is fairly well adapted for actuating a receiver equipped with a picture tube possessing one electron gun for each of the three primary colors (red, green, and blue), the signal must undergo some type of modification if it is to be utilized for actuating a receiver equipped with a picture tube possessing only one electron gun. Such a receiver has the advantage of greater economy in that the manufacturing thereof is easier and there is no problem of adjustment to obtain the exact registration of images from three different electron guns. My invention is concerned with the modification or conversion which the color television signal must undergo in order to become suitable for actuation of a color picture tube of the single-electron-gun-type.

A color television signal of the type presently favored in the industry may be described by the following expression:

$$E_m = E_y + K_1(E_x - X_0E_y)\sin(\omega t+\phi) + K_1K_2(E_z - Z_0E_y)\sin(\omega t-\theta) \quad \text{Eq. 1}$$

where:

$E_m$ is the composite video signal including both brightness and color information;

$E_y$ is the luminance or brightness signal;

$E_x$ and $E_z$ are voltages proportional respectively to X and Z, the two tristimulus values established by the International Committee on Illumination which relate only to chromaticity, and not to luminance, or brightness; (see Wintringham, "Color Television and Colorimetry," Proceedings of the Institute of Radio Engineers, vol. 39, No. 10, page 1135);

$\omega = 2\pi$ times the frequency of the chrominance subcarrier wave, which is approximately 3.58 megacycles per second;

$$K_1 = 1.67$$
$$K_2 = 0.30$$
$$X_0 = 0.98$$
$$Z_0 = 1.18$$
$$\phi = 89/57.3 \text{ radians}$$
$$\theta = 30/57.3 \text{ radians}$$

which are constants fixed by the specifications of the television signal favored in the industry; and, $t$ is the instantaneous time at which it is desired to measure $E_m$.

Alternatively, the color television signal of the same type may be described by another expression, as follows:

$$E_m = E_y + \alpha(E_R - E_y)\cos\omega t + \beta(E_B - E_y)\sin\omega t \quad \text{Eq. 2}$$

where:

$E_m$, $E_y$, $\omega$, and $t$ are as defined above;

$E_R$ is a voltage proportional to the red primary component of color of the element of image being scanned;

$E_B$ is a voltage proportional to the blue primary component of color of the element of image being scanned;

$$\alpha = 0.877; \text{ and}$$
$$\beta = 0.493.$$

In order to show the relationship between Equations 1 and 2, $E_y$ may be expressed in terms of the voltages proportional to the primary color components of the element of image being scanned, as follows:

$$E_y = .30\,E_R + .59\,E_G + .11\,E_B \quad \text{Eq. 3}$$

where:

$E_y$, $E_R$ and $E_B$ are as defined above; and $E_G$ is a voltage proportional to the green primary component of color of the element of image being scanned.

The color television signal as specified by Equations 1, 2, and 3 is favored in the industry because its transmission characteristics are good. Specifically, such a signal permits the transmission through a limited-bandwidth channel of information sufficient to produce an image roughly equivalent in its luminance detail to the usual image produced by a monochrome, or black-and-white picture receiver, together with sufficient color information to tint the received image satisfactorily. In other words, this signal specification is favored because it is such as to permit economy in the use of a limited channel spectrum, and minimum interference between luminance and chrominance components of the signal, and because it is such as to permit monochrome receivers in common use, as well as color receivers, to derive an acceptable image therefrom. Although this signal specification is very satisfactory as to its information-transfer properties, it happens to be such as to present certain difficulties in sampling, and resolution of the color components, particularly where a color picture tube of the single-electron-gun type is to be utilized. These difficulties result from the fact that such a tube can have only one signal at a time applied to its grid and the fact that such a signal should be expressive of each of the color components of an element of image in sequence. The signal specified by Equations 1, 2, and 3, while in a sense sequential, is not at any one time expressive of a single color component of an element of image.

Accordingly, a primary object of my invention is to provide a means for transforming the signal as specified by Equations 1, 2, and 3 to create a signal which is strictly sequential in nature.

A general object of my invention is to provide a means for transforming any signal which has certain sequential properties expressed by trigonometric functions into a signal which is strictly sequential in nature, whether for color television or for some other purpose.

A specific object of my invention is to provide a means for transforming the signal as expressed by Equation 1 or 2 into a signal suitable for application to a color-television picture tube of the single-electron-gun type.

A further specific object of my invention is to provide a means for transforming a signal expressible by an equation similar to Equation 1 or 2 into a signal resolvable into its chrominance components by a process of symmetrical sampling, which is to say, by a process of sampling at equal time intervals.

Briefly, the apparatus which I have invented adds to a modified version of the signal described by Equation 1 two other signals derived from the signal described by that equation. The first of these derived signals may be generated from the chrominance components (the last two terms in Equation 1) of the television signal, by a synchronous demodulator driven by a wave of frequency $\omega$ (as defined above) and of appropriate phase. The second of these derived signals, on the other hand, may be generated from the luminance component $E_y$ by a balanced modulator, again driven by a wave of frequency $\omega$ and of appropriate phase. The design of the apparatus of my invention is such that the sum of the modified version of the signal defined by Equation 1 and of the two signals derived therefrom is a sequential signal capable of detection by symmetrical sampling.

For additional objects and advantages, and for a better understanding of the invention, attention is now directed to the following description and the accompanying drawings. The features of the invention which are believed to be novel are pointed out with particularity in the appended claims.

Figure 1:
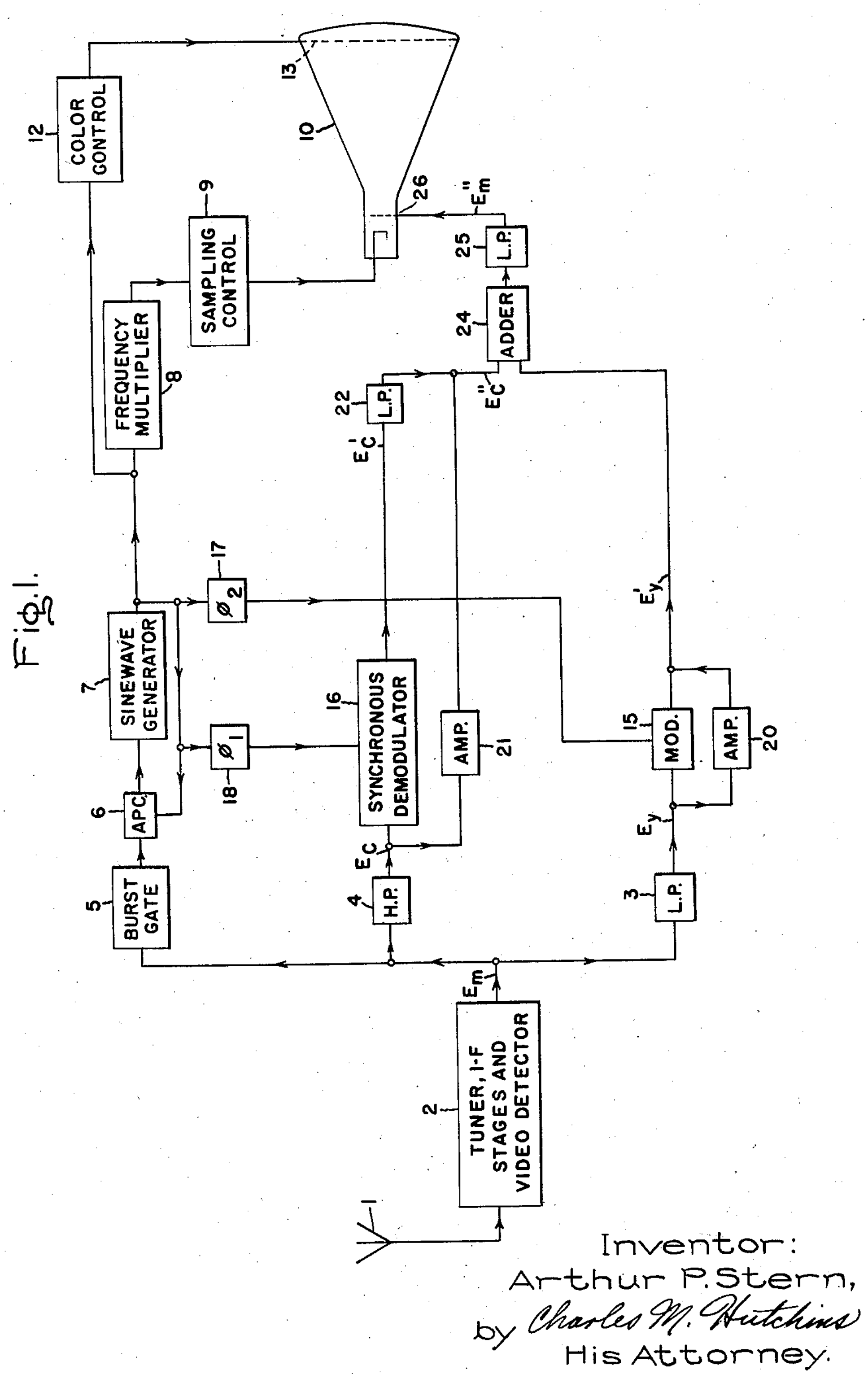
Fig. 1 is a schematic circuit diagram of a color television receiver embodying the signal-transformation circuits of my invention, in which the modulator and demodulator components appear in parallel circuit branches.

Although much work in the field of color television has been done with receiver picture tubes using an electron gun for each of the three primary colors (red, green, and blue), certain advantages reside in receiver picture tubes having only a single electron gun. Such advantages include the features of decreased manufacturing cost and absence of the problem inherent in obtaining the exact coincidence of the images from three electron guns. However, a picture tube with a single electron gun, or single-gun tube, must be actuated by a signal which is expressive of the three primary color components of the image in sequence. In other words, since a single-gun tube can be controlled by only one signal voltage at a time, the three necessary primary-color signal voltages cannot be supplied to the tube simultaneously, but must be supplied sequentially. Further, some color control mechanism must be provided, in order to insure that the electron beam of the color tube is at all times directed toward a screen phosphor which will glow in a color corresponding to the sequential color signal which at that instant is controlling the tube. Such a color control mechanism may comprise a variably-charged mesh of deflecting grid wires so arranged as to deflect the electron beam to the proper phosphor on the face of the tube, or may comprise any other suitable means for directing the electron beam to the proper phosphor corresponding to the color represented by the tube-actuating signal at that instant. The details of such color control mechanisms are beyond the scope of my invention, which pertains to the signal transformation required in order to obtain a sequential signal in proper form for use.

The problem to which my invention is directed is the fact that the commonly-accepted composite color television signal as defined above by Equations 1 and 2 is not suitable for actuating a tube requiring a strictly sequential signal. The apparatus of my invention is capable of altering the signal of Equation 1 or 2 to make it suitable for actuating such a tube. Such a transformation includes not only the conversion of the signal of Equation 1 or 2 into a strictly sequential signal, but also the adjustment of the signal so that the three primary color components can be sampled symmetrically, or at equal time intervals. The possibility of such symmetrical sampling means that the third harmonic of the frequency $\omega$, as defined above, can be used as the sampling wave which establishes the times for sampling the signal delivered to the single-gun color tube. Thus, the sampling wave can be easily obtained in the receiver by tripling the frequency $\omega$, which can in turn be obtained from the "color burst" or waveform of frequency $\omega$ which is commonly transmitted between every two lines of color television picture signal as the image is scanned, line by line. Again, the detailed means for the derivation of the sampling wave is outside the scope of my invention, which pertains to the apparatus and process for putting the color television signal in condition for sampling.

Let us turn again to the drawings and analyze the components which contribute to the operation of my invention. Components which appear in the same fashion in all figures of the drawings have been assigned reference numerals which are the same throughout, while components which are not respectively the same in all figures or appear in different relative circuit arrangements in different figures have been assigned different reference numerals in the several figures.

Figure 2:
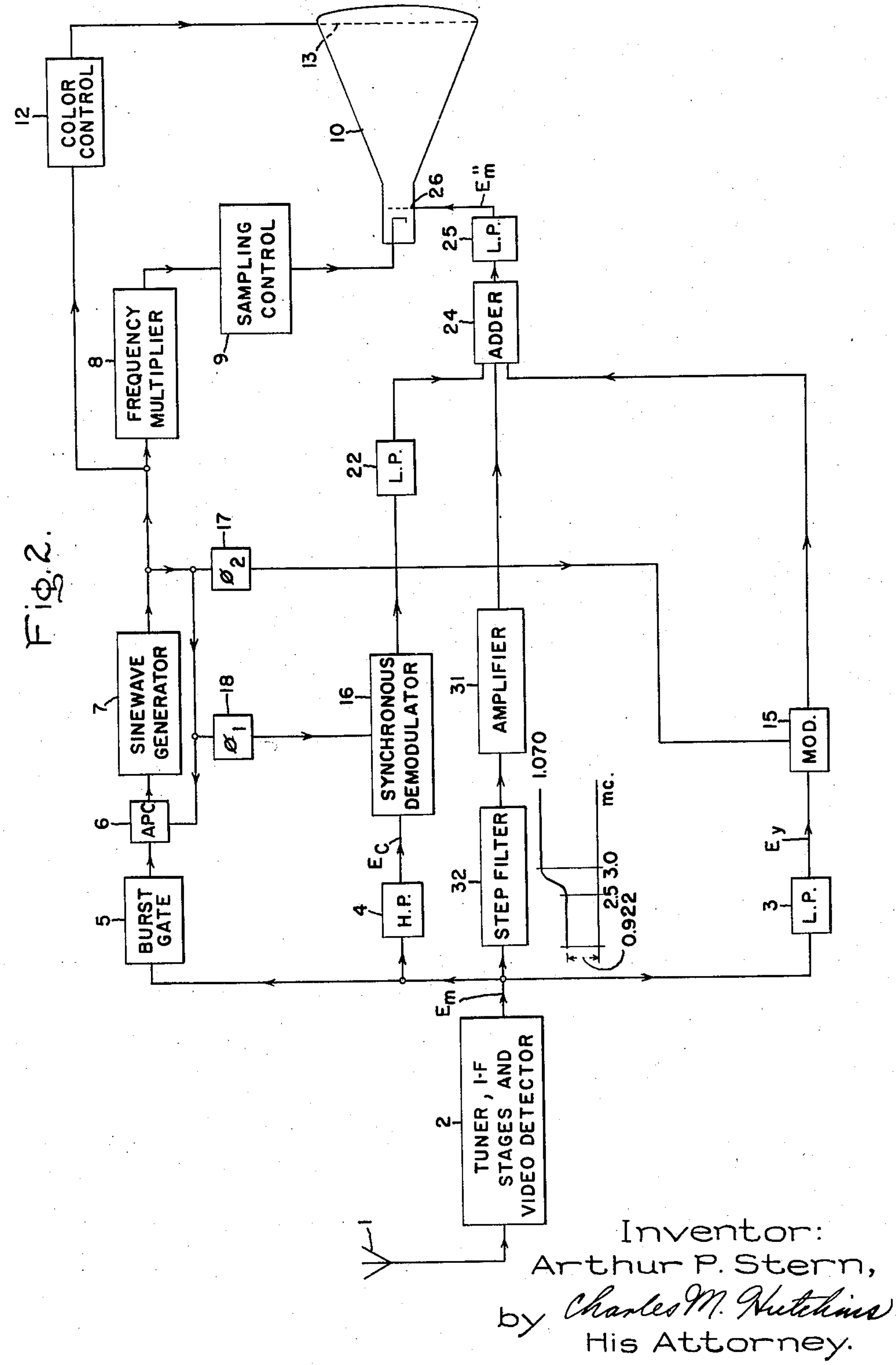
Fig. 2 is a modified schematic circuit diagram of a receiver embodying the circuits of my invention in a somewhat different parallel arrangement.
Figure 3:
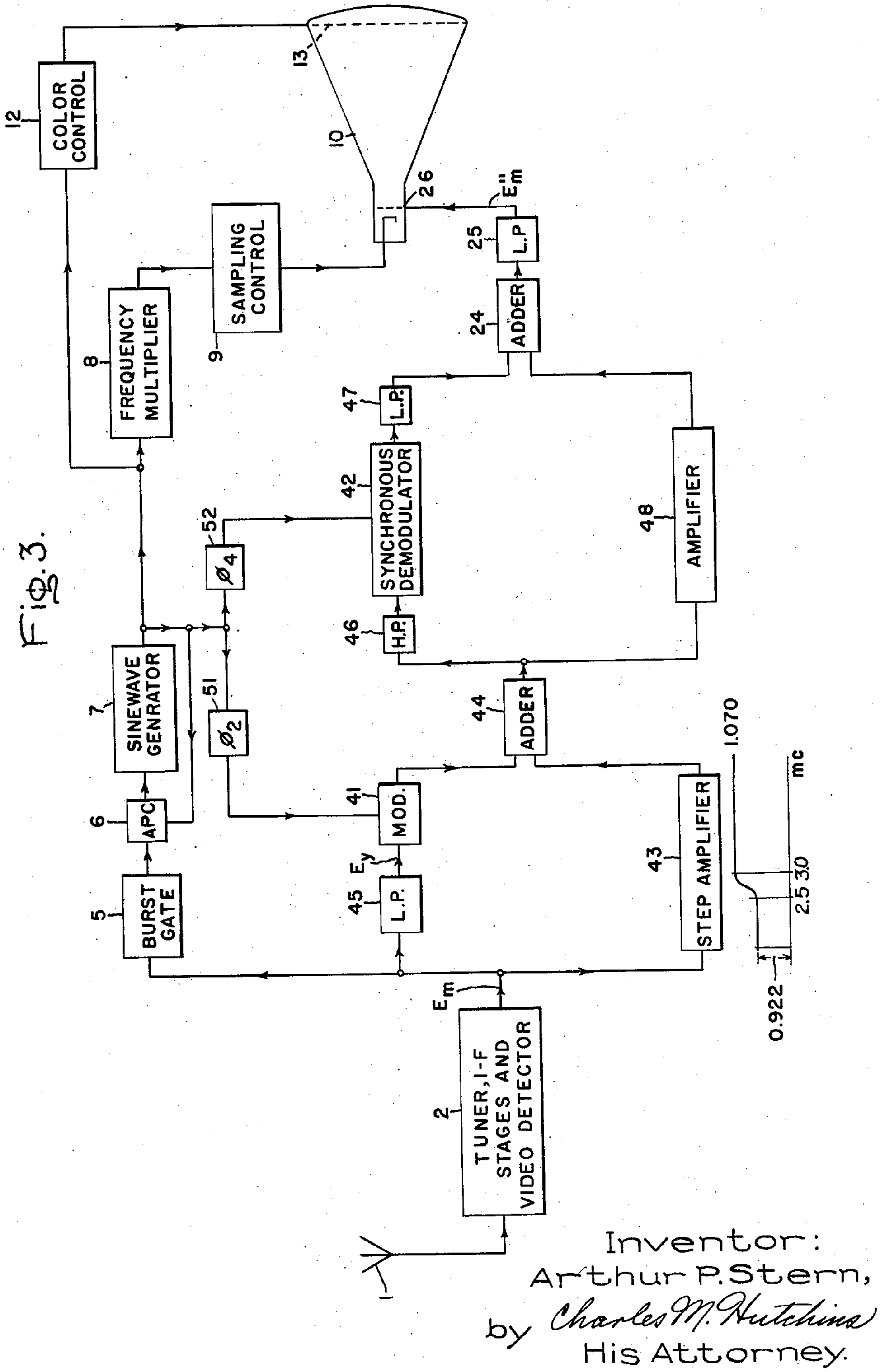
Fig. 3 is a further modified schematic circuit diagram of a receiver embodying the circuits of my invention, in which the modulator and demodulator components appear in series-circuit relation.

In Figures 1, 2 and 3, the transmitted wave, including both video and audio information, is conventionally received by an antenna 1, from which the signal goes to a tuner, intermediate-frequency stages, and a video detector (all represented by the block 2). The output of the video detector is the composite color signal $E_m$ as defined by Equations 1 and 2 above.

In the receiver of Fig. 1, the composite color signal goes to a low-pass filter 3, a high-pass filter 4, and a burst gate circuit 5. Low-pass filter 3 passes the luminance component $E_y$ but rejects most of the chrominance component $E_c$ of the composite signal. On the other hand, high-pass filter 4 passes the chrominance component $E_c$ but rejects most of the luminance component $E_y$ of the composite signal. Since the frequency spectra of $E_y$ and $E_c$ overlap each other, a simple filter is not capable of accomplishing perfect separation thereof, but adequate performance may be obtained respectively with a low-pass filter passing frequencies below about 3 megacycles per second and a high-pass filter passing frequencies above about 2.5 megacycles per second. Burst gate circuit 5 derives from the composite signal $E_m$ a phase and frequency reference on the basis of which an automatic phase control circuit 6 and a sinewave generator 7 reproduce the chrominance subcarrier wave $\omega$ as defined above.

The subcarrier wave $\omega$ is supplied to a frequency multiplier 8 which produces a sampling wave to be employed by a sampling control circuit 9 in actuating a cathode ray tube 10 at the desired instants as described above. The reproduced subcarrier wave $\omega$ also goes to a color-control circuit 12 which energizes a color-control electrode 13, as described above, to insure that the cathode-ray-tube beam strikes the proper phosphors on the screen at the proper times. The above-described circuitry (elements 5 through 13) may be of any suitable known construction, and the details thereof do not form part of my invention.

As described above, low-pass filter 3 in the embodiment of Fig. 1 passes the luminance component $E_y$ while rejecting most of the chrominance component $E_c$ of the composite video signal $E_m$. Similarly, high-pass filter 4 passes the chrominance component $E_c$ while rejecting most of the luminance component $E_y$. The output of low-pass filter 3 goes to a modulator 15, while the output of high-pass filter 4 goes to a synchronous demodulator 16. In modulator 15, $E_y$ is multiplied by a wave of subcarrier frequency $\omega$ which has undergone a suitable phase shift in phase shifter 17. In synchronous demodulator 16, on the other hand, $E_c$ is multiplied by another wave of subcarrier frequency $\omega$ which has undergone a suitable phase shift in phase shifter 18. It will be seen that both phase shifters 17 and 18 are themselves supplied from sinewave generator 7, which has been described above. Furthermore, the output of sinewave generator 7 is fed back to automatic-phase-control circuit 6 in order to provide a closed-loop system for controlling the phase (relative to the components of the subcarrier $\omega$) of the output of sinewave generator 7. Phase shifters 17 and 18 may be of conventional construction and may have amplification or attenuation functions as well as phase-shifting functions. The amounts of phase shift and of amplification or attenuation required of phase shifters 17 and 18 are determined mathematically and will be specified in the brief mathematical discussion which will follow this description of the components of the circuit.

The output of modulator 15 has added to it a signal derived from $E_y$ by an amplifier 20, of which the characteristics will be specified in the mathematical discussion to follow. It will be noted that the amplitude and phase of the modulating wave applied in modulator 15 are controllable and furnish two degrees of freedom in the processing of the luminance signal $E_y$. Furthermore, amplifier 20 has a controllable gain, thereby furnishing a third degree of freedom in the processing of the luminance signal $E_y$.

Turning to the circuit branch in which the chrominance signal $E_c$ is selected from the composite signal $E_m$ by high-pass filter 4, two additional degrees of freedom are secured as a result of the controllable phase and amplitude of the wave derived from phase shifter 18 and applied in synchronous demodulator 16. A third additional degree of freedom is secured as a result of the controllable amount of amplification supplied by an amplifier 21. The second-harmonic components present in the output of demodulator 16 as a result of the multiplication therein are eliminated from said output by a low-pass filter 22, whereupon the filtered output is combined with the output of amplifier 21 to form a signal which is fed to an adder 24. In adder 24, this signal derived from amplifier 21 and filter 22 is combined with a signal $E_y'$ derived from modulator 15 and amplifier 20, thus producing at the adder output terminals a signal based upon the original composite signal $E_m$ as defined early in this specification, but differing from $E_m$ as a result of signal modifications involving a total of six degrees of freedom. The circuit arrangement can be altered in a number of ways as long as the arrangement still permits signal modifications involving a total of six degrees of freedom. That is, any circuit arrangement in order to process the signal $E_m$ properly for symmetrical sampling must permit six independent signal modifications.

It will now be explained briefly, and not rigorously, why any circuit capable of performing the desired signal transformation must be characterized by six degrees of freedom. The substitution of Equation 3 into Equation 2 gives Equation 4, which represents the commonly accepted standard of color television signal transmission:

$$E_m = .30E_R + .59E_G + .11E_B + .877[.70E_R - .59E_G - .11E_B]\cos\omega t + .493[-.30E_R - .59E_G + .89E_B]\sin\omega t \quad \text{Eq. 4}$$

This signal $E_m$ is to be transformed into a signal of the general type specified by Equation 5, which defines a signal capable of symmetrical sampling:

$$E = \frac{1}{3}rE_R + \frac{1}{3}gE_G + \frac{1}{3}bE_B + \left[\frac{1}{3}rE_R - \frac{2}{3}gE_G + \frac{1}{3}bE_B\right]\sin\omega t + \frac{1}{\sqrt{3}}[rE_R - bE_B]\cos\omega t \quad \text{Eq. 5}$$

where $r$, $g$, and $b$ are respectively gain factors expressing the relationship between the intensity of the cathode-ray-tube beam and the resulting brilliance with which the red, green and blue phosphors glow. These quantities are subject to certain physical limitations dependent upon available phosphor materials, but for a general mathematical analysis must be considered to be independent of each other. Although it might at first glance seem that the signal transformation apparatus would require nine degrees of freedom in order that each coefficient in Equation 4 be transformed into the corresponding coefficient of Equation 5, it becomes apparent on closer inspection that the ratios between the coefficients of the quantity $E_R$ in Equation 5 are fixed, as are the ratios between the coefficients of the quantity $E_G$ and of the quantity $E_B$. Hence, if the coefficient of each of these quantities is fixed in two terms of Equation 5, the corresponding coefficient of that quantity in the third term is thereby fixed. This means that two degrees of freedom are required in order to fix all three coefficients of each literal quantity $E_R$, $E_G$, or $E_B$, and a total of only six, rather than nine, degrees of freedom are required in all.

The processing of the signal becomes complete when the output of adder 24 is stripped of all harmonics above the fundamental by means of a low-pass filter 25. If adder 24 has peaking-circuit characteristics, a separate low-pass filter may not be necessary because the peaking characteristics can result in effective elimination of the frequency components above the fundamental. After elimination of the harmonics, the signal is in condition for symmetrical sampling and may be supplied to a grid 26 of the color picture tube. The signal may be supplied to a picture tube or utilized in any desired fashion. As has been pointed out early in this specification, my invention relates only to the processing of the signal $E_m$, or of some comparable signal, and not to the final use to which the processed signal is put.

Earlier in this specification, allusion was made to a mathematical statement of the exact description of the modulations and amplifications to which the chrominance signal $E_c$ and the luminance signal $E_y$ are subjected. It is appropriate to introduce that mathematical statement at this time.

If Equation 3, specifying the composition of the luminance signal $E_y$ in the commonly accepted color-television standards, is substituted into Equation 2, specifying the composite color television signal $E_m$, then Equation 2 takes on the following form:

$$E_m=.30E_R+.59E_G+.11E_B+.877[.70E_R-.59E_G-.11E_B]\cos\omega t+.493[-.30E_R-.59E_G+.89E_B]\sin\omega t \quad \text{Eq. 4}$$

As has been pointed out, Equation 4 specifies the commonly accepted standards for the composite television signal ready to be modified for symmetrical sampling. In the embodiment of Figure 1, this signal, $E_m$, is divided by low-pass filter 3 and high-pass filter 4 so that the luminance signal $E_y$ is fed to modulator 15 and amplifier 20, while the chrominance signal $E_c$ is fed to demodulator 16 and amplifier 21. It should be explained that, although a distinction in nomenclature is made between the modulator and the demodulator, the operation which takes place in both pieces of apparatus is fundamentally a multiplication by a wave or waves of subcarrier frequency. The only reason for making the distinction in nomenclature between modulator and demodulator in Fig. 1 is that the components translated upward in frequency by the modulator are retained, whereas low-pass filter 22 eliminates the upward-translated frequency components from the output of the demodulator.

Continuing the discussion of Figure 1, the wave by which the signal $E_y$ is multiplied in modulator 15 may be expressed as a sum of a "sine" term and a "cosine" term, while the amplification of $E_y$ accomplished in amplifier 20 may be expressed as a multiplication by a simple constant, $A_1$. Thus, the signal $E_y'$ may be represented as the product $(.30E_R+.59E_G+.11E_B)\times(A_1+B_1\cos\omega t+C_1\sin\omega t)$. Similarly, the signal derived from $E_c$ and formed from the output of filter 22 and amplifier 21 may be expressed as the product of $$\{.877[.70E_R-.59E_G-.11E_B]\cos\omega t+.493[-.30E_R-.59E_G+.89E_B]\sin\omega t\}$$

with $(A_2+B_2\cos\omega t+C_2\sin\omega t)$. When this product is taken, and the double-frequency terms are eliminated, as takes place in low-pass filter 22, the resulting expression describes the contribution $E_c''$ to the adder 24. When this expression for $E_c''$ is combined with the expression above for $E_y'$ the resulting expression describes the output of adder 24, from which low-pass filter 25 then removes any extraneous double-frequency terms which may have appeared. The expression for the output of filter 25 may then be arranged so that all terms containing $E_R$ are grouped together, while all terms containing $E_G$ are likewise grouped, and all terms containing $E_B$ are also gathered together.

Now that an expression for $E_m''$ representing the sum of the outputs of the modulator, the demodulator, and the two amplifiers has been obtained, with higher frequency terms removed, and terms of like color grouped together, the magnitude of the six assumed constants in the expression must be determined. In other words, the magnitudes of $A_1$, $B_1$, $C_1$, $A_2$, $B_2$, and $C_2$ must be established in such a way as to produce an output signal $E_m''$ capable of symmetrical sampling, the attainment of which is a principal object of my invention. In order that such an output be attained, the requirements are as follows:

There must be an instant $t$ when the phase angle of $E_m''$ with respect to an arbitrary reference, the $(E_R-E_y)$ subcarrier wave, is $\phi_R$, and at that instant $E_m''$ must be proportional to $E_R$, the red component voltage. Further, there must be another instant when the phase angle of $E_m''$ with respect to the same arbitrary reference is $(\phi_R+120°)$, and at that instant $E_m''$ must be proportional to $E_G$, the green component voltage. Still further, there must be still another instant when the phase angle of $E_m''$ with respect to the same arbitrary reference is $(\phi_R+240°)$, and at that instant $E_m''$ must be proportional to $E_B$, the blue component voltage. If desired, these six constants might alternatively be established such that the color sequence is reversed and so that $E_m''$ is proportional to $E_B$ at an angle 120° after being proportional to $E_R$ and is proportional to $E_G$ at an angle 240° after being proportional to $E_R$. In order for $E_m''$ to be proportional to $E_R$ alone at the instant $t$ when the phase angle is $\phi_R$, the terms containing $E_G$ in the equation for $E_m''$ must at that time $t$ add to zero. Likewise, at time $t$, the terms containing $E_B$ in that equation must add to zero. Thus, two simultaneous equations are obtained, based upon the statement that at time $t$ when the phase angle is $\phi_R$, the over-all coefficients of $E_G$ and $E_B$ must severally be equal to zero. Likewise, two more simultaneous equations result from the statement that, at the time represented by 120° angular displacement from time $t$, the coefficients of $E_R$ and $E_B$ must severally be equal to zero. Further, two additional simultaneous equations result from the statement that, at the time represented by 120° angular displacement from both the aforementioned times, the coefficients of $E_R$ and $E_G$ must severally be equal to zero. Thus, a total of six simultaneous equations homogeneous in $A_1$, $B_1$, $C_1$, $A_2$, $B_2$, and $C_2$ and having the additional unknown $\phi_R$ are obtained. In order to avoid a trivial solution $$(A_1\equiv B_1\equiv C_1\equiv \ldots \equiv 0)$$

the determinant of this system of equations must vanish, as is true in the case of any system of homogeneous equations. Equating the determinant to zero leads to a value of 18.7 degrees for $\phi_R$. Then, the values of the ratios $A_1/B_1$, $A_1/C_1$, $A_1/A_2$, $A_1/B_2$ and $A_1/C_2$ can be determined by solving the system of equations, in which the value $\phi_R=18.7$ degrees has been substituted. Finally, if a value is arbitrarily chosen for $A_1$, or for any other one of the constants $B_1$, $C_1$, $A_2$, $B_2$ or $C_2$, the remainder of those constants may be found by simply solving the ratios. The existence of the six simultaneous equations, independent of one another, demonstrates again that six degrees of freedom are required of the apparatus of this invention in order to achieve the transformation into a signal capable of symmetrical sampling.

If it be arbitrarily assumed that $A_1$ has a value of 0.922, the values of the other five constants will be as follows:

$$B_1=0.097$$
$$C_1=-0.225$$
$$A_2=1.070$$
$$B_2=0.383$$
$$C_2=0.587$$

These values of the six constants correspond to a phase advance of the wave in phase shifter 17 of 67 degrees referred to the $(E_R-E_y)$ subcarrier wave at the point where the advanced wave enters modulator 15, a phase retardation of the wave in phase shifter 18 of 58 degrees referred to the $(E_R-E_y)$ subcarrier at the point where the retarded wave enters demodulator 16, a gain in modulator 15 of 0.245, a gain in demodulator 16 of 0.350, a gain in amplifier 20 of .922, and a gain in amplifier 21 of 1.070.

The terms amplifier, modulator and demodulator have been used in a general sense without regard for the question as to whether the gain therein is greater or less than unity. In the demodulator 16, the term "gain" has been used to mean the ratio of the D.-C. output value to the zero-to-peak value of the A.-C. input.

It will be noted that, in order to have a phase reference, it has been necessary to compare the phase of the sine waves applied in the modulator and the demodulator with the phase of one of the subcarrier waves in the modulator or demodulator respectively. In the modulator, this comparison necessarily involves a slight degree of approximation because of the tacit assumption that the time delay suffered by the vestiges of the subcarrier waves which get through low-pass filter 3 to modulator 15 does not differ greatly from the time delay suffered by the luminance component in reaching modulator 15 through low-pass filter 3. It will be understood that any small difference in time delay experienced by the signal in passing through the modulator branch and the signal passing through the demodulator branch can be equalized by conventional means before reaching adder 24.

Figure 4:
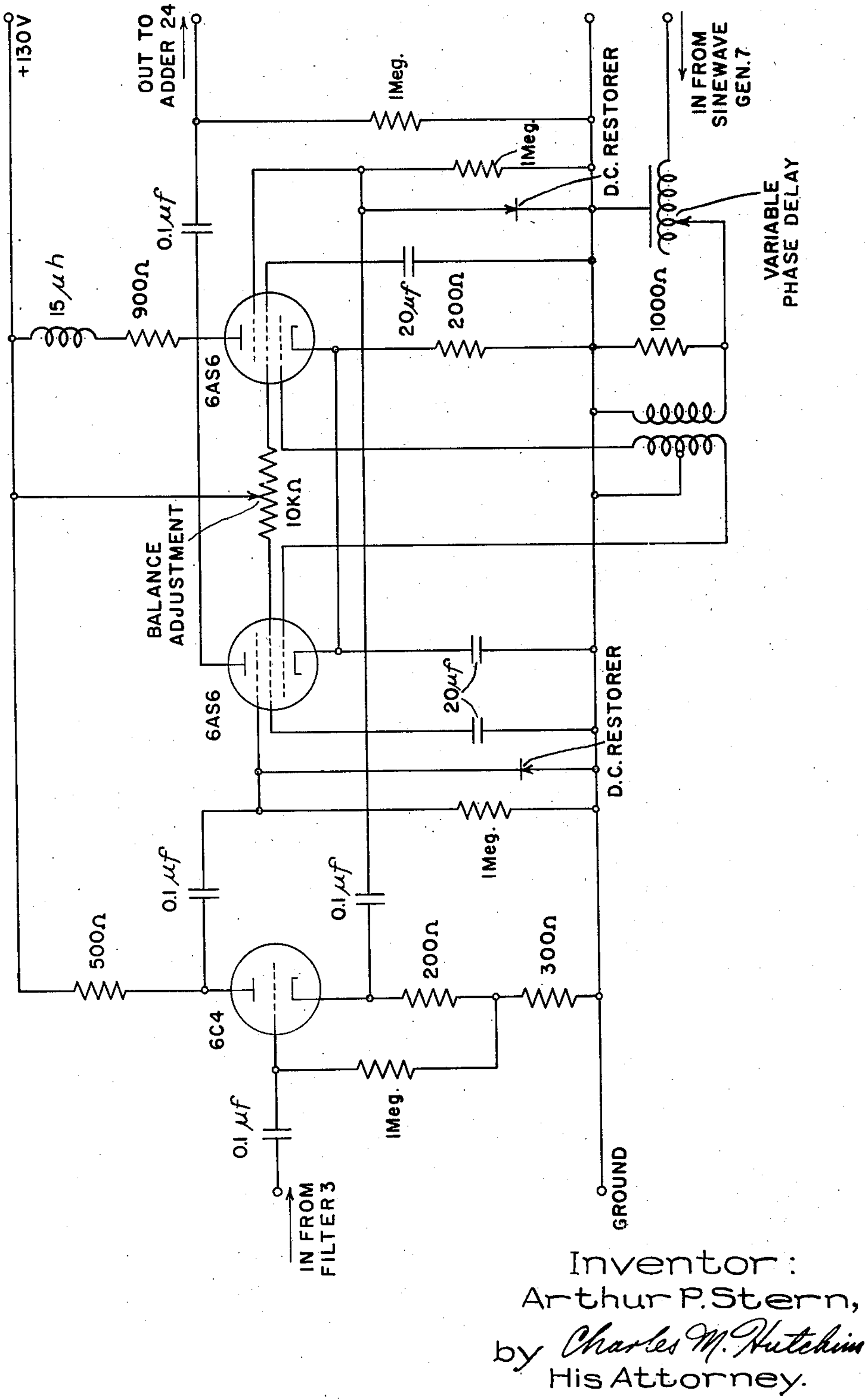
Fig. 4 is a detailed circuit diagram of a modulator and its associated phase shifter which may be used in the practice of my invention.
Figure 5:
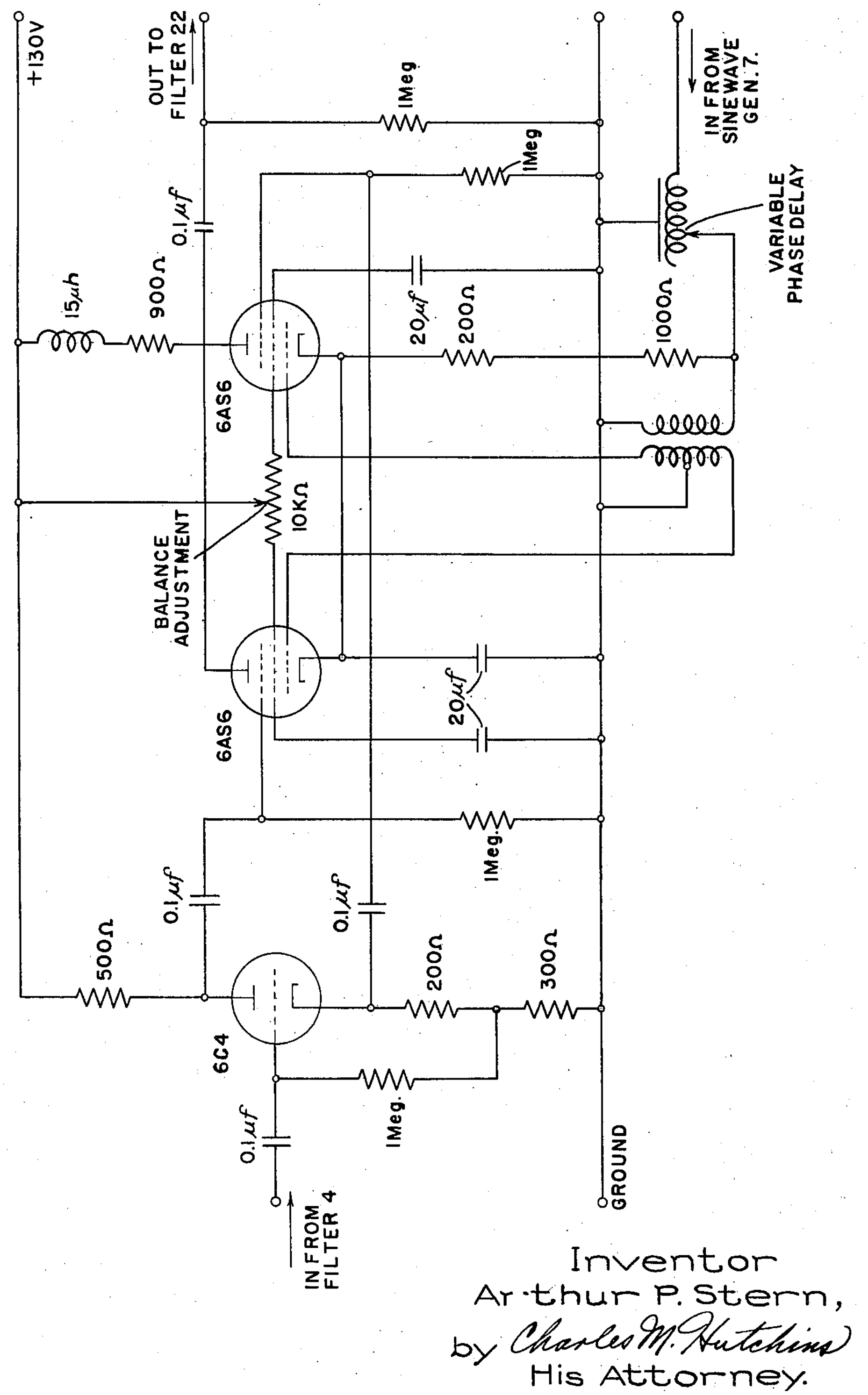
Fig. 5 is a detailed circuit diagram of a synchronous demodulator and its associated phase shifter which may be used in the practice of my invention.

As for the detailed construction of modulator 15 and demodulator 16, and of phase shifter 17 and 18, Fig. 4 shows a practical circuit configuration for the combination of modulator 15 with phase shifter 17, while Fig. 5 shows a practical circuit configuration for the combination of demodulator 16 with phase shifter 18. In Fig. 4, the circuitry below the ground line constitutes phase shifter 17, while the circuitry above the ground line constitutes balanced modulator 15. The input triode of the modulator is shown as a 6C4 having approximately equal resistances in its plate and cathode circuits, thus being in the nature of a so-called "phase-splitter." While the output of the triode plate is coupled to one pentode of the modulator, shown as a 6AS6 for purposes of illustration, the cathode of the triode is connected by means of a cathode-follower circuit to the other pentode of the modulator, likewise shown as a 6AS6. The phase-shifter output is coupled to the control grids of the two pentodes in push-pull relationship, and the balance potentiometer between screen grids of the two pentodes is adjusted so that for a zero input to modulator 15 from filter 3, there will be a zero output from modulator 15 to adder 24.

In Figure 5, the circuitry below the ground line constitutes phase shifter 18, while the circuitry above the ground line constitutes synchronous demodulator 16. It will be observed that demodulator 16 differs from modulator 15 only in the omission of the D.-C. restorer diodes. In a manner similar to that characterizing the circuitry of Fig. 4, the balance potentiometer between screen grids of the two pentodes is adjusted so that for a zero input to demodulator 16 from filter 4, there will be a zero output from demodulator 16 to filter 22. It will be understood that the detailed circuitry of Figures 4 and 5 is exemplary only, and that any equivalent circuitry may be substituted therefor. It will be understood further that the combinations of Figures 4 and 5 can be incorporated either in an over-all receiver configuration according to Figure 1 or in other over-all receiver configurations as exemplified by Figures 2, 3, or modifications thereof which produce substantially the same result as the configuration of Figure 1 in substantially the same manner.

In Figure 2, for instance, some degree of circuit simplification has been accomplished by combining in one branch the functions of the two amplifiers 20 and 21 of Figure 1. That is, instead of the modulator and the demodulator each having its own bypass amplifier (one for amplifying the luminance signal $E_y$, and the other for amplifying the chrominance signal $E_c$), there is a single amplifier 31, which operates upon the complete signal $E_m$. The requirement that $E_c$ and $E_y$ have different amplifications is satisfied by feeding $E_m$ to amplifier 31 through a step filter 32 or an equivalent device which amplifies or attenuates different frequencies to different degrees, the characteristic being somewhat in the form of a step, with a rather sharp change in gain at the point in the frequency spectrum where the chrominance and luminance spectra overlap. Such a characteristic may be such as shown by the graph adjacent filter 32 in Figure 2. As will be noted, this characteristic shows a gain of substantially .922 in the range below 2.5 megacycles per second, with a gain of substantially 1.070 in the range above 3.0 megacycles per second, and with a transition zone between 2.5 and 3.0 megacycles per second. These values will be observed to correspond respectively to $A_1$ and $A_2$ as specified in the discussion of the circuit of Figure 1. Moreover, the characteristics of the modulator and the demodulator in the circuit of Figure 2 are the same as those in the circuit of Figure 1, and the phase shifts $\phi_1$ and $\phi_2$ are the same in the circuits according to the two figures. In other words, the only substantial change in going from Figure 1 to Figure 2 is the substitution of the amplifier 31 and step filter 32 for amplifiers 20 and 21, the composite characteristics in the two circuits being substantially the same. Step filter 32 may be of any type well known in the art or may itself comprise a parallel combination of two band-pass filters, each of which is in series with a suitable amplifier, the combination feeding its output to the adder.

Turning to the circuit of Figure 3, it will be observed that a more radical departure from the circuit of Figure 1 has been made than was made in the circuit of Figure 2. In the circuit of Figure 3, the modulator 41 and demodulator 42 have been put in series, rather than in parallel, as was the case of modulator 15 and demodulator 16 of Figure 1. Nevertheless, the amount of phase shift $\phi_2$ introduced by phase shifter 51 into the wave applied in modulator 41 is the same as that of the wave applied in modulator 15 of the embodiment of Figure 1, so that the wave of subcarrier frequency applied in modulator 41 leads the $(E_R-E_y)$ subcarrier wave therein by an angle of 67 degrees. Likewise, the amount of phase shift $\phi_4$ introduced by phase shifter 52 should be such that the wave of subcarrier frequency applied in demodulator 42 lags the $(E_R-E_y)$ subcarrier wave therein by an angle of 58 degrees. Further, while the gain of modulator 41 may have the same figure, 0.245, as does modulator 15 of the Figure 1 configuration, the gain of demodulator 42 should be 0.328, rather than the 0.350 figure of demodulator 16 of the configuration of Figure 1.

Turning to the other branches of the circuit of Figure 3, I have shown a step amplifier 43 for processing the signal $E_m$ and passing the processed signal along to an adder 44. Such a step amplifier should have a frequency-response characteristic in the form of a step and similar to the over-all frequency-response characteristic of amplifier 31 and step filter 32 of Figure 2. That is, the gain below a frequency of about 2.5 megacycles per second should be approximately 0.922, while the gain above a frequency of about 3.0 megacycles should be approximately 1.070, with a transition in the characteristics between those frequencies. It should be noted that the series combination of amplifier 31 and step filter 32, in the configuration of Figure 2, is interchangeable with a step amplifier 43 of the characteristics shown in Figure 3. That is, a step amplifier can be substituted for the series combination of an amplifier and a step filter, or vice versa. It should likewise be noted that, in all configurations of my invention, parallel circuit branches should be provided with delay-equalizing circuits to overcome the dephasing effect of delay in filters. Moreover, in the case of parallel circuit branches, equal additional gains may be introduced as long as the proper relative gains are maintained in the parallel circuit branches.

Returning to the other circuit elements in the configuration of Figure 3, the purpose of the low-pass filter 45 is, of course, to pass the luminance component $E_y$ but reject most of the chrominance component $E_c$. Hence, filter 45 should pass only frequencies below approximately three megacycles per second and may be of any standard construction well known in the art. Filter 46 should reject low-frequency signals and pass only the modified high-frequency signals, above approximately 2.5 megacycles per second. Filter 46 may be of any known construction which permits it to satisfy the above-mentioned criterion. Since the purpose of the low-pass filter 47 is mainly to reject double-frequency signals created in synchronous demodulator 42, it may be of standard construction as long as it rejects all components of frequencies over approximately three megacycles per second.

In the remaining branch of the circuit of Figure 3, the amplifier 48 may be of any standard construction and should have a gain of substantially unity. The outputs of low-pass filter 47 and of amplifier 48 are then combined in an adder 24, of which the output is fed to a low-pass filter 25 and to the control circuit 26 of the cathode ray tube 10. As previously pointed out, if adder 24 has peaking-circuit characteristics such as to eliminate any extraneous second-harmonic components, low-pass filter 25 becomes unnecessary. It will be noted that various modifications may be made in the circuit of Figure 3 without depriving the circuit of its requisite six degrees of freedom. One such modification would be to reverse the order of the two parallel-circuit subcombinations so that the synchronous demodulator stage appears first, and the modulator stage appears second. In that case, the phase shifts $\phi_2$ and $\phi_4$ imposed upon the applied waves would, of course, also have to be interchanged. It should further be noted that various modifications may be made in the other configurations shown and described without departing from the principles of my invention. Therefore, the appended claims are intended to cover any such modifications within the true spirit and scope of the invention.

What I claim as new and desire to secure by Letters Patent of the United States is:

1. A system for modifying a composite color television signal, said composite color television signal comprising a luminance component and at least one chrominance component, said chrominance component having been impressed on a subcarrier wave, said system including at least two parallel branches, each of which is disposed to be excited by said composite color television signal, a first one of said parallel branches including low-pass filter means for extracting said luminance component from said composite color television signal and modulator means for multiplying said luminance component by a wave having a frequency substantially equal to that of said chrominance component subcarrier wave and having a first predetermined phase with respect to said sub-carrier wave to produce a wave whose frequency is equal to the sum of the frequencies of the waves applied thereto, a second one of said parallel branches including demodulator means for multiplying its input signal by a wave having a frequency substantially equal to that of said chrominance component subcarrier wave and having a second predetermined phase with respect to said sub-carrier wave to produce a wave whose frequency is equal to the difference in the frequencies of the input waves applied thereto, means shunting said demodulator means for providing a path of predetermined gain to signals from the input to the output of said demodulator, and a signal adder excited from the output and of each of said parallel branches.

2. A system for modifying a composite color television signal, said composite color television signal comprising a luminance component and at least one chrominance component, said chrominance component having been impressed on a subcarrier wave, said system including at least two parallel branches, each of which is disposed to be excited by said composite color television signal, a first one of said parallel branches including modulator means for multiplying said luminance component by a wave having a frequency substantially equal to that of said chrominance component subcarrier wave and having a first predetermined phase with respect to said sub-carrier wave to produce a wave whose frequency is equal to the sum of the frequencies of the waves applied thereto a second one of said parallel branches including demodulator means for multiplying its input signal by a wave having a frequency substantially equal to that of said chrominance component subcarrier wave and having a second predetermined phase with respect to said sub-carrier wave to produce a wave whose frequency is equal to the difference in the frequencies of the input waves applied thereto, means shunting said demodulator means for providing a path of predetermined gain to signals from the input to the output of said demodulator, and a signal adder excited from the output end of each of said parallel branches.

3. A system for modifying a composite color television signal, said composite color television signal comprising a luminance component and at least one chrominance component, said chrominance component having been impressed on a subcarrier wave, said system including at least two parallel branches, each of which is disposed to be excited by said composite color television signal, a first one of said parallel branches including low-pass filter means for extracting said luminance component from said composite color television signal and modulator means for multiplying said luminance component by a wave having a frequency substantially equal to that of said chrominance component subcarrier wave and having a first predetermined phase with respect to said sub-carrier wave to produce a wave whose frequency is equal to the sum of the frequencies of the waves applied thereto, a second one of said parallel branches including high-pass filter means for extracting said chrominance component from said composite color television signal and demodulator means for multiplying said chrominance component by a wave having a frequency substantially equal to that of said chrominance component subcarrier wave and having a second predetermined phase with respect to said sub-carrier wave to produce a wave whose frequency is equal to the difference in the frequencies of the input waves applied thereto, means shunting said demodulator means for providing a path of predetermined gain to signals from the input to the output of said demodulator, and a signal adder excited from the output end of each of said parallel branches.

4. A system for modifying a composite color television signal, said composite color television signal comprising a luminance component and at least one chrominance component, said chrominance component having been impressed on a subcarrier wave, said system including at least two parallel branches, each of which is disposed to be excited by said composite color television signal, a first one of said parallel branches including low-pass filter means for extracting said luminance component from said composite color television signal and modulator means for multiplying said luminance component by a wave having a frequency substantially equal to that of said chrominance component subcarrier wave and having a first predetermined phase with respect to said sub-carrier wave to produce a wave whose frequency is equal to the sum of the frequencies of the waves applied thereto, means shunting said modulator means for providing a path of predetermined gain to signals from the input to the output thereof, a second one of said parallel branches including demodulator means for multiplying its input signal by a wave having a frequency substantially equal to that of said chrominance component subcarrier wave and having a second predetermined phase with respect to said sub-carrier wave to produce a wave whose frequency is equal to the difference in the frequencies of the input waves applied thereto, means shunting said demodulator means for providing a path of predetermined gain to signals from the input to the output thereof, and a signal adder excited from the output end of each of said parallel branches.

5. A system for modifying a composite color television signal, said composite color television signal comprising a luminance component and at least one chrominance component, said chrominance component having been impressed on a subcarrier wave, said system including at least two parallel branches, each of which is disposed to be excited by said composite color television signal, a first one of said parallel branches including low-pass filter means for extracting said luminance component from said composite color television signal and modulator means for multiplying said luminance component by a wave having a frequency substantially equal to that of said chrominance component subcarrier wave and having a first predetermined phase with respect to said sub-carrier wave to produce a wave whose frequency is equal to the sum of the frequencies of the waves applied thereto, a second one of said parallel branches including demodulator means for multiplying its input signal by a wave having a frequency substantially equal to that of said chrominance component subcarrier wave and having a second predetermined phase with respect to said sub-carrier wave to produce a wave whose frequency is equal to the difference in the frequencies of the input waves applied thereto, means shunting said demodulator means for providing a path of predetermined gain to signals from the input to the output thereof, and a series combination of a signal adder and low-pass filter for combining the outputs of each of said parallel branches.

6. A system for modifying a composite color television signal, said composite color television signal comprising a luminance component and at least one chrominance component, said chrominance component having been impressed on a subcarrier wave, said system including at least two parallel branches, each of which is disposed to be excited by said composite color television signal, a first one of said parallel branches including low-pass filter means for extracting said luminance component from said composite color television signal and modulator means for multiplying said luminance component by a wave having a frequency substantially equal to that of said chrominance component subcarrier wave and having a first predetermined phase with respect to said sub-carrier wave to produce a wave whose frequency is equal to the sum of the frequencies of the waves applied thereto, a second one of said parallel branches including demodulator means for multiplying its input signal by a wave having a frequency substantially equal to that of said chrominance component subcarrier wave and having a second predetermined phase with respect to said sub-carrier wave to produce a wave whose frequency is equal to the difference in the frequencies of the input waves applied thereto, means shunting said demodulator means including frequency-responsive means for providing a path of predetermined gain as a function of frequency from the input to the output of said demodulator, and a signal adder excited from the output end of each of said parallel branches.

7. A system for converting into a sequential signal a color television signal of the type defined as the sum of a luminance component, a red color-difference chrominance component impressed upon a first subcarrier wave, and a blue color-difference chrominance component impressed upon a second subcarrier wave of equal frequency but ninety-degree phase displacement behind said first subcarrier wave, said system comprising first means for deriving said luminance component, second means for deriving a wave of subcarrier frequency, third means for deriving said chrominance portion, and at least two circuit branches, a first of said circuit branches including a modulator coupled to said first and second means for multiplying said luminance component by a wave of subcarrier frequency and having a first predetermined phase with respect to said sub-carrier wave to produce a wave whose frequency is equal to the sum of the frequencies of the waves applied thereto, a second of said circuit branches including a demodulator coupled to said second and third means for multiplying said chrominance portion by a wave of subcarrier frequency and having a second predetermined phase with respect to said sub-carrier wave to produce a wave whose frequency is equal to the difference in the frequencies of the input waves applied thereto, a first amplifier bypassing said modulator for providing a path of predetermined gain to signals applied thereto, and a second amplifier bypassing said demodulator for providing a path of predetermined gain to signals applied thereto and means joining said circuit branches for coupling the outputs thereof to a common output branch.

8. A system for converting into a sequential signal a color television signal of the type defined as the sum of a luminance component, a red color-difference chrominance component impressed upon a first subcarrier wave, and a blue color-difference chrominance component impressed upon a second subcarrier wave of equal frequency but ninety-degree phase displacement behind said first subcarrier wave, said system comprising first means for deriving said luminance component, second means for deriving a wave of subcarrier frequency, third means for deriving said chrominance portion, and at least two circuit branches, a first of said circuit branches including a modulator coupled to said first means and through a first phase adjusting means to said second means for multiplying said luminance component by a wave of subcarrier frequency and having a first predetermined phase with respect to said sub-carrier wave to produce a wave whose frequency is equal to the sum of the frequencies of the waves applied thereto, means for adjusting the gain of said modulator, a second of said circuit branches including a demodulator coupled to said second means and through a second phase adjusting means to said third means for multiplying said chrominance portion by a wave of subcarrier frequency and having a second predetermined phase with respect to said sub-carrier wave to produce a wave whose frequency is equal to the difference in the frequencies of the input waves applied thereto, means for adjusting the gain of said demodulator, a first amplifier of adjustable gain bypassing said modulator, and a second amplifier of adjustable gain bypassing said demodulator, said six adjustments facilitating said conversion and means joining said circuit branches for coupling the outputs thereof to a common output branch.

9. A system for converting into a sequential signal a color television signal of the type defined as the sum of a luminance component, a red color-difference chrominance component impressed upon a first subcarrier wave, and a blue color-difference chrominance component impressed upon a second subcarrier wave of equal frequency but ninety-degree phase displacement behind said first subcarrier wave, said system comprising first means for deriving said luminance component, second means for deriving a wave of subcarrier frequency, third means for deriving said chrominance portion, and at least two circuit branches, a first of said circuit branches including a modulator coupled to said first and second means for multiplying said luminance component by a wave of subcarrier frequency and having a first predetermined phase with respect to said sub-carrier wave to produce a wave whose frequency is equal to the sum of the frequencies of the waves applied thereto, a second of said circuit branches including a demodulator coupled to said second and third means for multiplying said chrominance portion by a wave of subcarrier frequency and having a second predetermined phase with respect to said sub-carrier wave to produce a wave whose frequency is equal to the difference in the frequencies of the input waves applied thereto, means shunting said first and second circuit branches including frequency sensitive amplitude changing means for providing a path of predetermined gain as a function of frequency to signals from the input to the output thereof, and means joining said circuit branches for coupling the outputs thereof to a common output branch.

10. A system for converting into a sequential signal a color television signal of the type defined as the sum of a luminance component, a red color-difference chrominance component impressed upon a first subcarrier wave, and a blue color-difference chrominance component impressed upon a second subcarrier wave of equal frequency but ninety-degree phase displacement behind said first subcarrier wave, said system comprising first means for deriving said luminance component, second means for deriving a wave of subcarrier frequency, third means for deriving said chrominance portion, and the series combination of two circuit branches, a first of said circuit branches including a modulator coupled to said first and second means for multiplying said luminance component by a wave of subcarrier frequency and having a first predetermined phase with respect to said sub-carirer wave to produce a wave whose frequency is equal to the sum of the frequencies of the waves applied thereto, a second of said circuit branches including a demodulator coupled to said second and third means for multiplying said chrominance portion by a wave of subcarrier frequency and having a second predetermined phase with respect to said sub-carrier wave to produce a wave whose frequency is equal to the difference in the frequencies of the input waves applied thereto, said modulator being bypassed by a frequency-sensitive amplitude-changing means, and said demodulator being bypassed by an amplifier of predetermined gain.

11. A system for modifying a composite color television signal, said composite color television signal comprising a luminance component and at least one chrominance component, said chrominance component have been impressed on a subcarrier, said system comprising an input circuit for coupling said composite color television signal to the series combination of two networks each having at least one circuit branch, a first one of said circuit branches in a one network including modulator means for operating upon said luminance component to multiply said luminance component by a wave of predetermined phase having substantially the frequency of said sub-carrier to produce a wave whose frequency is equal to the sum of the frequencies of the waves applied thereto, a second one of said circuit branches in the other network including demodulator means for operating upon the chrominance portion of said composite color television signal to multiply said chrominance component by a wave of predetermined phase having substantially the frequency of said sub-carrier to produce a wave whose frequency is equal to the difference in the frequencies of the input waves applied thereto, means shunting said modulator means for providing a path of predetermined gains dependent upon whether the signal is above or below a predetermined frequency to signals from the input of said one branch to the output thereof, and means shunting said other branch for providing a path of predetermined gain to signals from the input of said other branch to the output thereof, means for adding the signal components for application to a color television tube.

References Cited in the file of this patent

UNITED STATES PATENTS 2,734,940 Loughlin _______________ Feb. 14, 1956